United States Patent [19]

Ehrenfels

[11] 4,243,835
[45] Jan. 6, 1981

[54] NON-RIGID MECHANICAL COUPLING FOR A FIRE-RATED FEED-THROUGH FITTING AND METHOD OF MAKING

[75] Inventor: Alfred L. Ehrenfels, Cheshire, Conn.

[73] Assignee: Harvey Hubbell, Incorporated, Orange, Conn.

[21] Appl. No.: 48,824

[22] Filed: Jun. 15, 1979

[51] Int. Cl.³ .............................................. H02G 3/22
[52] U.S. Cl. ...................................... 174/48; 165/135; 169/48; 285/194; 403/242
[58] Field of Search .......................... 174/48; 169/48; 285/192, 194; 403/242; 165/DIG. 7, 135; 215/13 R

[56] References Cited
U.S. PATENT DOCUMENTS

| | | | |
|---|---|---|---|
| 2,164,547 | 7/1939 | Smith | 285/194 X |
| 3,995,102 | 11/1976 | Kohaut | 169/48 X |
| 4,091,231 | 5/1978 | Sotolongo | 169/48 X |

*Primary Examiner*—B. A. Reynolds
*Assistant Examiner*—David A. Tone

[57] ABSTRACT

A non-rigid mechanical coupling for coupling a head assembly of a feed-through fitting to a slotted wiring conduit inserted in an opening formed in the floor of a building, wherein an apertured conduit flange is provided with plural tabs extending radially inwardly into plural slots formed in a common transverse plane in the conduit such that the conduit flange tabs are loosely retained in the conduit slots to provide a non-rigid mechanical connection therebetween. Assembly of the connection is achieved by forming the slots in the conduit, deforming radially inwardly each axial portion of the conduit between each slot and the end of the conduit, orienting the conduit flange at the end of the conduit in alignment with the deformed portions of the conduit, sliding the conduit flange onto the conduit until the tabs are seated against the undeformed edge of the slots, and reforming the deformed conduit portions to their original cross-section, whereby the tabs are radially and axially confined by the respective slots.

8 Claims, 7 Drawing Figures

NON-RIGID MECHANICAL COUPLING FOR A FIRE-RATED FEED-THROUGH FITTING AND METHOD OF MAKING

BACKGROUND OF THE INVENTION

1. Field of the Invention

This invention generally relates to cable conduit devices, and more particularly to a fire-rated feed-through fitting for transferring insulated wires through a concrete floor of a building, which fitting is characterized by a non-rigid mechanical coupling in the thermal path through the fitting. This invention further relates to a method of making a non-rigid mechanical fitting coupling.

2. Description of the Prior Art

Modern office buildings are typically multi-floor structures in which each floor is formed of a concrete slab. Typically with this form of structure, it has been customary to transmit power and telecommunications signals from floor to floor through openings provided in each floor for that purpose. Thus, it has been customary to form openings in the concrete floors, to insert a feed-through fitting through the opening, to pass the wires through the feed-through fitting from the opposite face of the floor to the top face of the floor, and to make connection to an electrical outlet mounted over the opening on the top face of the floor. While this technique for wiring a building is perfectly satisfactory from the standpoint of achieving the requisite wiring interconnections throughout the building, nevertheless it has been found that the ability of the building to contain a fire which may have been started on one floor is compromised as a result of the tendency of the fire to spread through the feed-through openings to adjacent floors.

Prior art feed-through fittings have included a head assembly mounted over the floor opening, a conduit secured to the head assembly and inserted in the floor opening, and a bottom face receptacle secured to the conduit and abutting the bottom face of the floor such that the floor is in effect clamped between the head assembly and the bottom face receptacle, thereby maintaining the entire assembly in place. Additionally, it has been known to separate the feed-through conduit into two sections and to dispose between the conduit sections an intumescent barrier which expands upon subjection to heat to block the opening and thereby retard the spread of fire and smoke through the opening. Similarly, intumescent barriers have also been disposed within the conduit itself to likewise prevent the spread of fire and smoke through the conduit. In spite of these precautions, however, it has been found that the heat generated by a fire is often of such intensity that the intumescent barrier is itself incinerated, thereby losing its effectiveness. Furthermore, since the conduit sections are formed of a metal, and are typically rigidly secured to the head assembly by bolts, nuts or other rigid means, the prior art fittings serve as an excellent thermal conductor of heat between floors, further aggravating the fire containment problem.

Typical feed-through insertion fittings of the prior art are disclosed in U.S. Pat. Nos. 3,751,576; 3,803,341; 3,864,883; 3,995,102; and 4,099,020. See also Abrams et al, "Fire Tests of Poke-Through Assemblies", *Fire Journal*, May, 1971, pp. 56–67 for an overview of the prior art.

SUMMARY OF THE INVENTION

Accordingly, it is the object of this invention to provide a new and improved fire-rated feed-through fitting for transferring insulated wires through an opening formed in a concrete floor of a building for making connection to respective receptacles mounted on an opposite floor face, which feed-through fitting exhibits improved fire retardation characteristics.

Yet another object of this invention is to provide a novel fire-rated feed-through fitting exhibiting reduced thermal conductivity.

A further object of this invention is to provide a novel fire-rated feed-through fitting characterized by non-rigid mechanical joints which result in reduced thermal conductivity, and which can resist severe axial loading.

Another object of this invention is to provide a novel method of fabricating a non-rigid mechanical joint for a fire-rated feed-through fitting.

These and other objects are achieved according to the invention by providing a fire-rated feed-through fitting with improved non-rigid mechanical interconnections which result in decreased thermal conductivity through the fitting without comprise of the mechanical integrity thereof.

The fire-rated feed-through fitting is inserted in an opening formed in the floor of a building. Electrical power and other signals are transmitted via wires connected to a source located at one face of the floor, through the fitting mounted in the opening and to respective receptacles connected to the wires and mounted on the opposite face of the floor. The fitting includes a head assembly for mounting the receptacles, which is located above the opening on the top floor face, a feed-through assembly disposed in the floor opening and coupled to the head assembly, and a retaining clamp for securing the fitting to the floor. The feed-through assembly includes a floor cup for storing excess slack wiring, a conduit for leading insulated wires through the floor opening to the cup, and therethrough to the head assembly, and a fire insulating barrier for retarding the spread of fire through the opening. The floor cup includes an apertured bottom flange coupled to the conduit by means of a conduit flange which is non-rigidly coupled to the conduit using the non-rigid mechanical connection of the invention, with the fire-retarding insulating barrier disposed between the cup bottom flange and the conduit flange.

The non-rigid mechanical connection of the invention between the conduit flange and the conduit is accomplished by the conduit flange being formed with a peripheral portion circumscribing an aperture shaped in correspondence with the conduit exterior dimensions, and plural tabs integrally formed with the outer portion and extending radially inwardly into the conduit aperture at common intervals around the circumference of the aperture. The conduit is provided with plural slots formed in the vicinity of one end of the conduit. These slots are spaced in a common transverse plane at intervals corresponding to the spacing intervals of the conduit flange tabs. Each of the conduit flange tabs have shoulder portions extending from the conduit annular portion, and a lip portion centered in the shoulder portion and extending therefrom into a corresponding conduit slot. Each shoulder portion abuts the conduit at opposed edges of the corresponding slot such that the conduit flange annular portion is circumferentially spaced apart from the conduit. Axial and rotational movement of the conduit flange is constrained by the confinement of the flange lip portions in the respective conduit slots.

According to the method of the invention, the conduit is firstly circumferentially slotted at predetermined places in a common plane at a predetermined distance from the end of the conduit. Then, those axial portions of the conduit between each slot and the end of the conduit are deformed radially inwardly. The conduit flange, previously formed with the above described tab portions which closely match the cross-section of the deformed portions of the conduit, is then mounted on the deformed end of the conduit with the lip portions of the tab portions seated in the respective slots, further axial movement of the conduit flange being stopped by the undeformed edge of the slot. Thereafter, the deformed portion of the conduit is reformed to its original cross-section such that the conduit flange is retained by the conduit and non-rigidly coupled thereto.

BRIEF DESCRIPTION OF THE DRAWINGS

A more complete appreciation of the invention and many of the attendant advantages thereof will be readily obtained as the same becomes understood by reference to the following detailed description when considered in connection with the accompanying drawings, wherein:

FIGS. 5-7 illustrate various stages of the method of fabricating the non-rigid conduit coupling of the invention wherein:

FIG. 5 is a perspective view of an undeformed feed-through conduit;

FIG. 6 is a perspective view of a slotted and deformed conduit; and

FIG. 7 is a plan view of a conduit flange engaging the slotted and deformed conduit.

DESCRIPTION OF THE PREFERRED EMBODIMENTS

Figure 1:
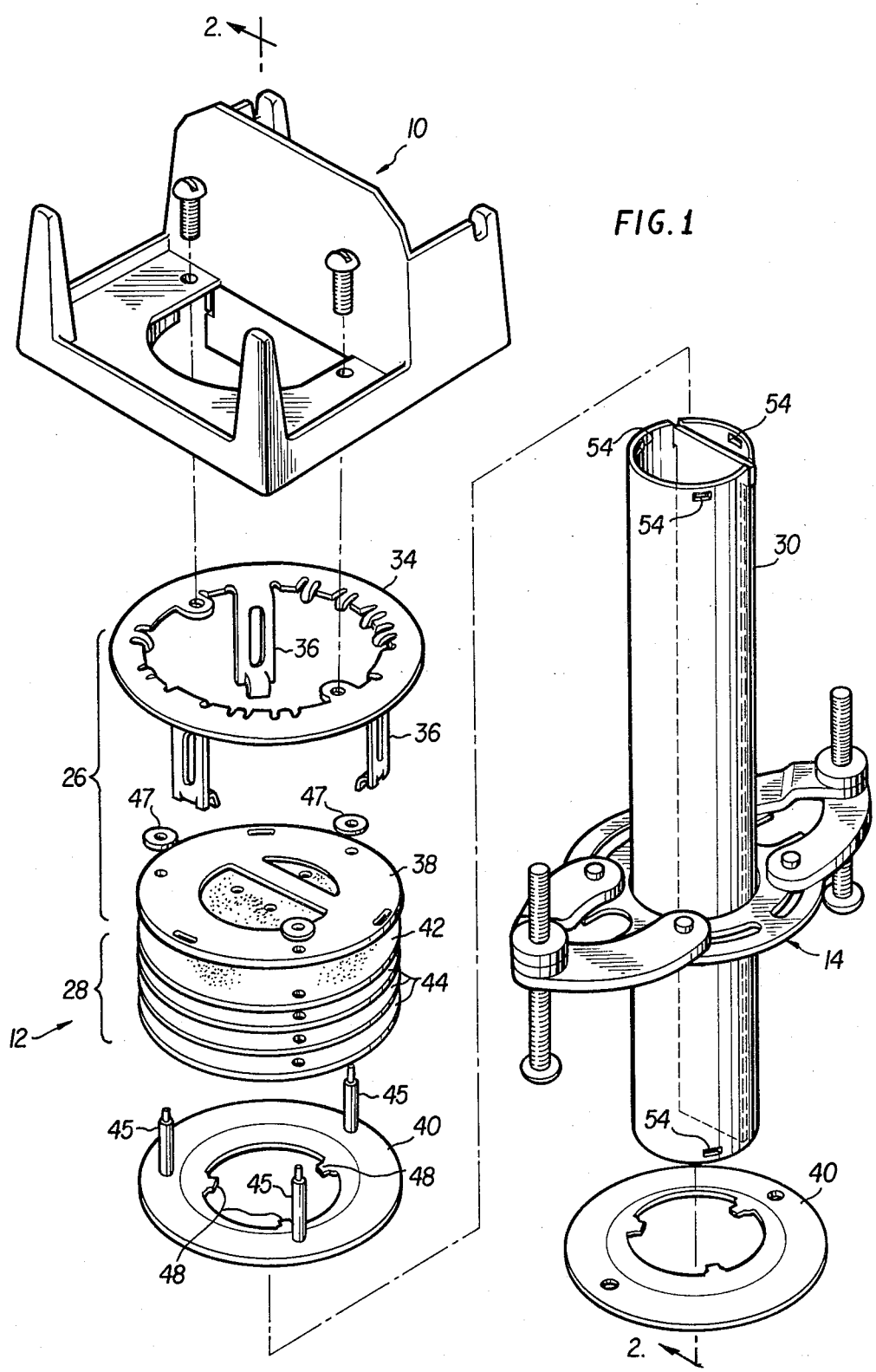
FIG. 1 is a partially exploded perspective view of one embodiment of a feed-through fitting employing the non-rigid mechanical connection of the invention.
Figure 2:
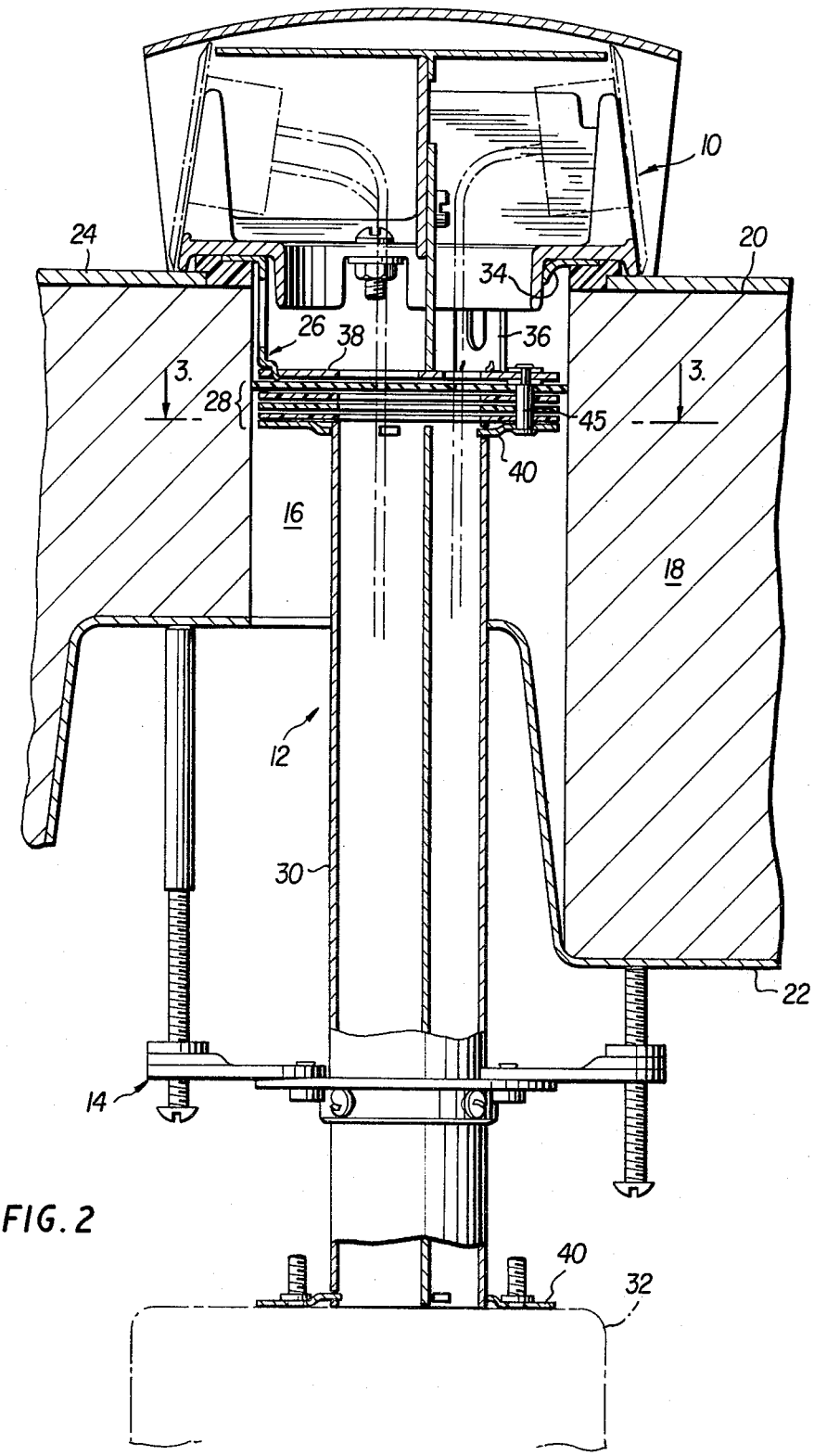
FIG. 2 is a vertical cross-sectional view of the assembled fitting taken along the lines 2—2 of FIG. 1, with the fitting shown in place in a floor opening.
Figures 3, 4:
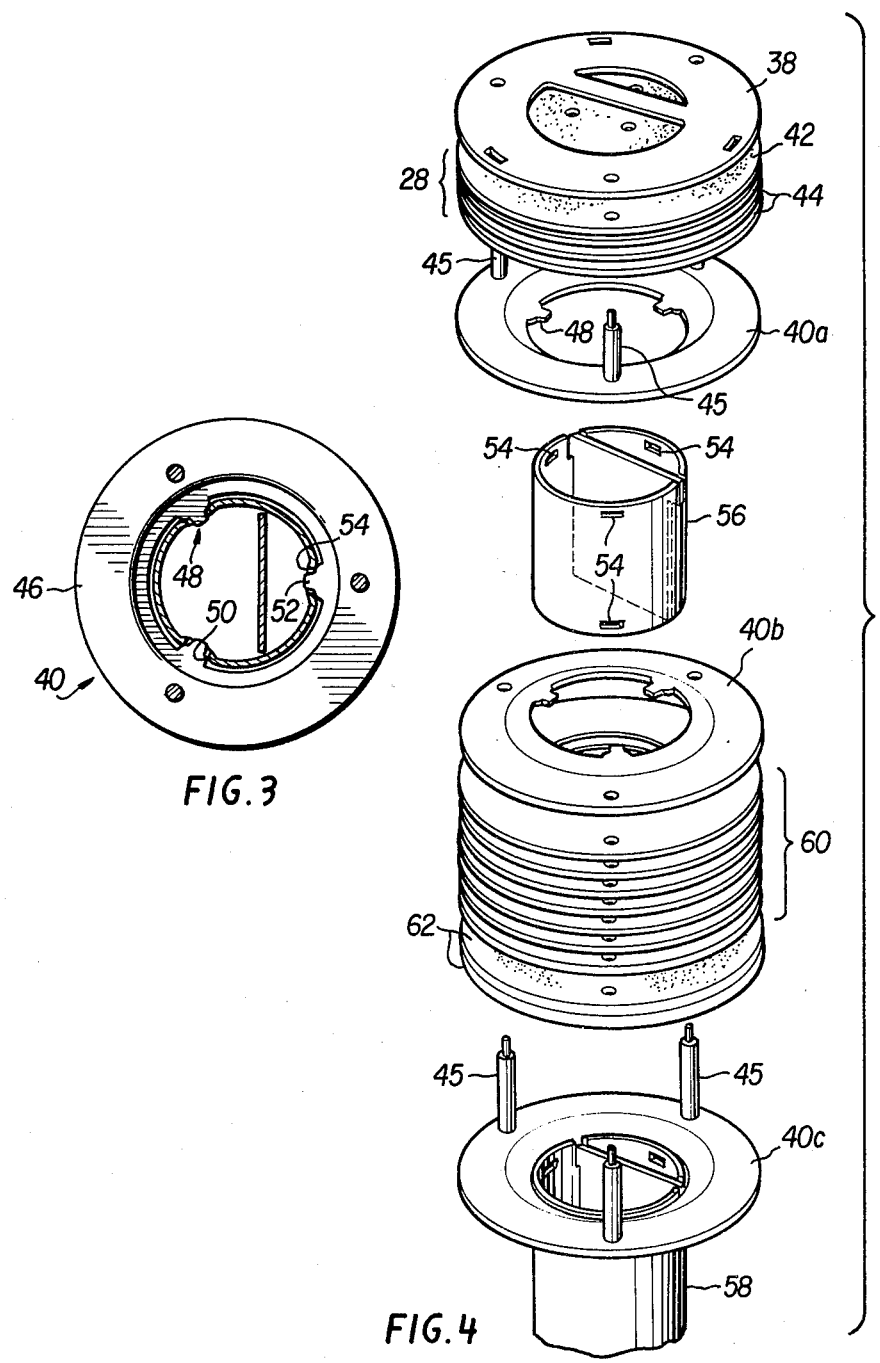
FIG. 3 is a horizontal cross-sectional view taken along the lines 3—3 of FIG. 2, illustrating the non-rigid mechanical connection according to the invention.
FIG. 4 is a fragmentary partially exploded perspective view of a portion of a second feed-through fitting embodiment employing the non-rigid mechanical connection according to the invention.

Referring now to the drawings, wherein like reference numerals designate identical or corresponding parts throughout the several views, and more particularly to FIGS. 1-3, the feed-through fitting incorporating the non-rigid mechanical coupling of the invention is seen to include a compartmentalized head assembly 10, a feed-through assembly 12, and a collapsible retaining clamp 14. As shown in FIG. 2, where the feed-through fitting of the invention is placed in an opening 16 formed in a concrete floor 18 having an essentially smooth top face 20 and a corrugated bottom face 22, the head assembly 10 is mounted on the top face 20 above the opening 16, usually in contact with floor tile or carpeting generally designated as 24.

The feed-through assembly 12 is seen to include a floor cup 26, a fire insulating barrier 28, and a tubular conduit 30. The collapsible retaining clamp 14 is mounted around the conduit 30. Additionally, a bottom floor receptacle assembly designated generally by the numeral 32 is coupled to conduit 30.

Detailed disclosure of the head assembly 10, the feed-through assembly 12 and the retaining clamp 14, and the respective structural components thereof are provided in commonly owned U.S. patent application by Goodsell, Ser. No. 48,703, filed June 15, 1979, which is therefore incorporated by reference herein.

As shown in FIGS. 1 and 2, the floor cup is formed of two pieces, an apertured top flange 34 mounted over the opening 16 and supported around the periphery of the opening by the top floor face 20, and a bottom flange 38 coupled to the top flange 34. Integrally formed with the top flange 34 and extending perpendicularly therefrom into the opening in the vicinity of the sidewalls of the opening are slotted leg members 36 spaced at common intervals around the inner perimeter of the top flange 34. The fire insulating barrier 28 is retained between the cup bottom flange 38 and the conduit 30 in order to retard the spread of fire through the floor opening 16. For the purpose of reducing the thermal conductivity of the fitting of the invention, and for retaining the insulating barrier between the conduit 30 and the floor cup bottom flange 38, a conduit flange 40 is non-rigidly coupled to the conduit 30 by means of the coupling of the invention, and the fire insulating barrier 28 is retained between the bottom flange 38 and the conduit flange 40.

The fire insulating barrier 28 includes a cold smoke gasket 42 mounted adjacent and beneath the cup bottom flange 38 and plural intumescent wafers 44 disposed between the smoke gasket 42 and the conduit flange 40. The smoke gasket 42 is made of silicon rubber or other suitable material having low thermal conductivity, and completely blocks the aperture formed in the bottom flange 38 except for small holes formed in the gasket 42 for the passage of wires therethrough. Each of the intumescent wafers 44 is concentrically apertured to permit passage of wires therethrough and is formed of suitable intumescent materials which foam and expand when subjected to elevated temperatures to effectively block off and fill the entire cross-sectional area of the opening 16 formed in the floor 18. Specific intumescent materials are well known in the art, with specific examples thereof being disclosed in U.S. Pat. No. 3,864,883 to McMarlin. Low thermal conductivity spacer-shafts 45 are employed to hold the bottom flange 38 and the conduit flange 40 of the fitting together. The spacer-shafts 45 are shouldered to provide a semi-rigid structure, with or without the intumescent wafers 44 in place, and include rivet-like end portions by which the spacer-shafts 45 are coupled to the cup bottom flange 38 and the conduit flange 40. Thermal conductivity from the spacer-shafts 45 to the cup bottom flange 38 is further reduced by the use of insulating washers 47 on both sides of the cup bottom flange 38 separating the cup bottom flange 38 from the spacer-shafts 45. Additionally, each of the spacer-shafts 45 are necked down at the rivet-like end portions thereof for connection of these smaller diameter portions of spacer-shafts 45 to the flanges 38 and 40, thereby further reducing thermal conductivity. Three spacer-shafts circumferentially spaced apart at 120° intervals are provided, thereby assuring three dimensional mechanical stability, with minimum thermal conductivity. Although four spacer-shafts 45 would also provide mechanical stability, the thermal conductivity would be proportionately increased. Thus the use of three spacer-shafts 45 represents an optimum configuration from a thermal and a mechanical standpoint.

Referring now to FIG. 3, in which the details of the non-rigid mechanical coupling of the invention are illustrated, it is seen that the conduit flange 40 includes an annular peripheral portion 46 circumscribing an aperture having a diameter larger than the diameter of the conduit 30. Formed integrally with the peripheral portion 46 are plural tabs 48 extending radially inwardly into the conduit flange aperture. The tabs 48 are spaced at 120° intervals around the circumference of the aperture, with three tabs being provided to assure adequate mechanical stability with minimal thermal conductivity. Each of the tabs are provided with shoulder portion 50, each having a lip portion 52 centered in the shoulder portion and further extending radially inwardly therefrom. The conduit 30 is provided with plural slots 54 formed in the vicinity of an end of the conduit and in a common transverse plane at intervals corresponding to the spacing of the conduit flange tabs 48. The shoulder portion 50 of a tab 48 has a width slightly greater than the width of the corresponding conduit slot 54, such that each tab shoulder portion 48 abuts the opposed edges of a corresponding conduit slot 54, with the respective lip portions 52 inserted in the conduit slot 54. The axial and circumferential dimensions of each slot 54 are selected larger than the corresponding dimensions of the lip portions 52 of tabs 48. In effect, slots 54 are "oversized" in comparison to lip portions 52. Thus, the conduit flange 40 is loosely axially and circumferentially retained by protuberance of the lip portions 52 of the tab 48 into respective conduit slots 54, with minimal contact and therefore thermal conductivity between the conduit 30 and the conduit flange 40 being made at the edges of the tab shoulder portion 50. As a result, the inner periphery of the annular portion of the conduit flange 40 is spaced apart from the conduit 30, with thermal coupling therebetween being minimized by the non-rigid loose mechanical coupling between the tab 48 and the opposed edges of the conduit slots 54.

The above-described feed-through fitting embodiment employing the non-rigid conduit coupling of the invention has been found to maintain a temperature of less than 325° F. above the starting ambient temperature at the floor top face 20 for a period of one hour upon subjection of the floor bottom face 22 to a temperature of about 1800° F.

In another feed-through fitting embodiment, useable on all but the thinnest of floors, it is desirable to split the fire insulating barrier into two portions, each of which is retained by at least one non-rigid conduit coupling according to this invention, to further decrease the thermal conductivity of the feed-through fitting. Additionally, in this way the overall efficiency of the fire-barrier is improved in regard to reduced heat transfer by providing an air gap between the two portions of the fire barrier. By these means, it has been possible to maintain a maximum temperature of 325° F. above the starting ambient temperature at the floor top face while subjecting the floor bottom face 22 to a temperature of about 2200° F. for a period of four hours, such that the second fitting employing the joint clearly meets this stringent performance specification established by Underwriters Laboratories.

In the second feed-through fitting embodiment noted above and partially shown in FIG. 4, the conduit 30 is formed of at least two sections, with each section having respective conduit flanges 40 non-rigidly coupled thereto as described hereinabove. Assuming two conduit sections, 56 and 58, four conduit flanges 40a–40d are then used. As discussed above, disposed between bottom flange 38 of the floor cup and a first conduit flange 40a attached to one end of the first conduit section 56 is disposed the first fire insulating barrier 28. Then, a second fire insulating barrier 60 is disposed between a conduit flange 40b non-rigidly attached to the opposite end of the first conduit section 56 and a third conduit flange 40c attached to one end of the second conduit section 58.

As noted in the copending application of Goodsell cross-referenced above, the second fire insulating barrier 60 optimally includes at least one fibrous non-intumescent ceramic wafer 62 adjacent the third conduit flange 40c attached to the end of the second conduit section 58 to provide an axial temperature drop great enough to minimize the possibility of the intumescent material melting when the fire temperature exceeds the melting temperature of the ceramic wafer 62. For this purpose, the ceramic wafer 62 completely overlaps the conduit aperture except for small holes provided therein for passage of wires therethrough. Supported above the ceramic wafer 62 are plural stacked intumescent wafers 44 extending to just below the second conduit flange 40b. Each of the intumescent wafers 44 of the second insulating barrier 60, as well as the intumescent wafers 44 of the first insulating barrier 28, are separated by spacing means which is the subject of a separate patent application by Babey, commonly owned by the assignee of this Application, Ser. No. 048,724, filed June 15, 1979. Three ceramic wafers 62 are provided to assure that with temperatures of about 2200° F. at the bottom floor face 22, the intumescent wafers 44 are exposed to a maximum temperature less than about 1800° to avoid disintegration thereof. The ceramic wafers 62 and the intumescent wafers 44 of the second fire insulating barrier 60 are maintained in place between the conduit flanges 40b, 40c by shouldered shafts 45. Obviously, additional ceramic wafers 62 can be stacked to improve the thermal barrier thereby provided.

Figure 6:
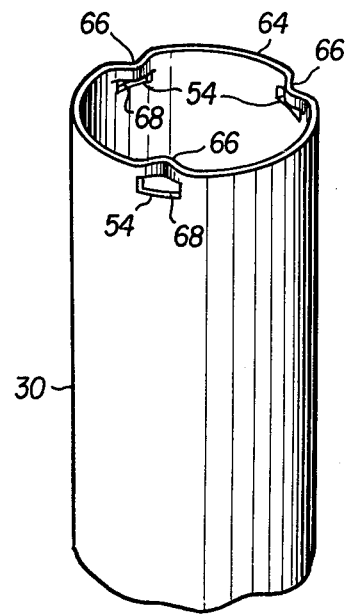
Figure 7:
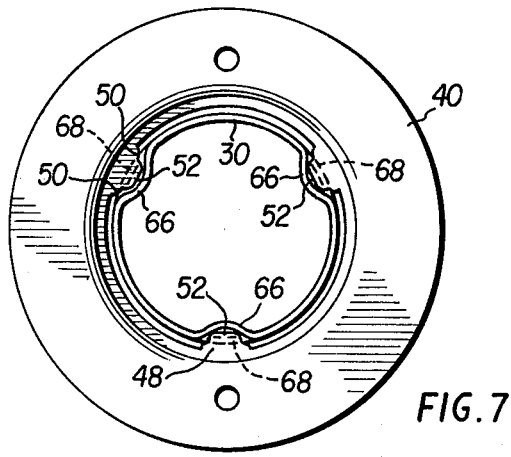

The method of fabricating the non-rigid conduit coupling of the invention is now described by reference to FIGS. 5–7. It is noted that while the method is described in terms of the connection of a generally circular conduit flange 40 to a generally cylindrical tubular conduit 30, the steps of the method can be practiced to accomplish the non-rigid coupling of virtually any desired shaped part to any tubular part.

Figure 5:
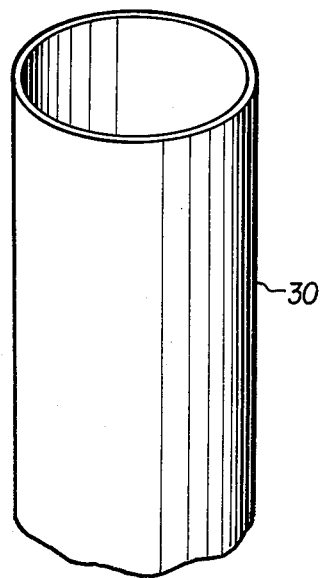

The fabrication of the non-rigid conduit coupling of the invention begins with the provision of an undeformed feed-through conduit 30 of the type shown in FIG. 5. This conduit 30 is circumferentially slotted at plural locations, with each of the slots 54 lying in a common transverse plane perpendicular to the axis of the conduit 30. Preferably, the slots 54 are located only a short distance from the end 64 of the conduit 30 to facilitate later deformation and reformation of the conduit 30. Subsequent to the slotting of the conduit 30, portions 66 of the conduit lying axially between the conduit slot 54 and the end 64 of the conduit are deformed radially inwardly a predetermined distance. Then, the conduit flange 40 is fabricated with tab portions 48 extending radially from the annular peripheral portion of the conduit flange 40, with the inner profile of the conduit flange 40, as defined by the inner periphery of the annular peripheral portion 46 and the tab 40 closely matching the deformed contour of the conduit 30. The conduit flange 40 is then mounted on the deformed end of the conduit 30 with the tabs 48 guided by the deformation grooves formed in the conduit 30 until the tabs 48 of the flange 40 rest on respective bottom edges 68 of the conduit slots 54. In this position, each lip 52 of a respective tab 48 is disposed in a respective conduit slot 54 as shown in FIG. 8. Thereafter, the deformed portions 66 of the conduit 30 are reformed to restore the original conduit cross-section to produce a non-rigid conduit coupling capable of resisting severe axial loading.

From the above description, it is clear that the aperture of the conduit flange 40 has a diameter at least as large as the outer diameter of the conduit 30. It is further evident that where conduits 30 and conduit flanges 40 are employed having non-circular cross-sections, it is only necessary that the conduit flange aperture be dimensioned in correspondence to the conduit cross-section. For use in a fire-rated feedthrough fitting, it is desirable to have the conduit flange 40 spaced apart from the conduit 30 in order to reduce the thermal coupling between the conduit 30 and the flange 40. Hence, the dimensions of the tab shoulders 50 and lip portions 52 are selected such that with maximum rotation of the conduit flange 40, or more exactly the lip portions 52 in the respective slots 54, the conduit 30 is spaced from the annular peripheral portion 46 of the flange 40 by means of at least one shoulder 50 of each tab 48. Naturally, if thermal conductivity between the conduit 30 and the flange 40 is not a primary consideration, it is quite possible to fabricate the non-rigid conduit coupling of the invention without the use of tab shoulders 50 to maintain the above-described conduit-conduit flange spacing.

It is further noted that the non-rigid conduit coupling according to this invention is based on a three point coupling concept by means of a trio of conduit/flange inner connections disposed circumferentially at 120° intervals. Such a connection provides maximal three-dimensional stability with minimum thermal coupling between the conduit 30 and the conduit flange 40. If, however, thermal conductivity is not a primary consideration, the coupling of the invention can be practiced using as few as two conduits/flange inner connections, or more than three such inner connections, depending upon the requirements of a particular application.

Obviously, numerous modifications and variations of the present invention are possible in light of the above teachings. For example, the lip portions 52 of tab 48 need not necessarily be centered with respect to shoulder 48, as long as at least a portion of each shoulder 48 is maintained between the conduit 30 and the peripheral portion 46 of the conduit flange 40. It is therefore to be understood that within the scope of the dependent claims, the invention may be practiced otherwise than as specifically described herein.

What is claimed as new and desired to be secured by Letters Patent of the United States is:

1. In a fire-rated feed-through fitting for transferring insulated wires through a conduit disposed in a circular opening formed in a floor of a building by which electrical power and other signals are transmitted from a source located at one face of said floor via said wires, through said fitting mounted in said opening to respective circuits connected to said wires and mounted on a head assembly disposed on the opposite face of said floor, an improved non-rigid joint for loosely mechanically coupling said head assembly to said conduit, comprising:

at least one conduit flange having a peripheral portion coupled to said head assembly, said peripheral portion circumscribing an aperture having an outline shaped in correspondence to the cross-sectional dimensions of said conduit, but larger than the conduit, and plural tabs integrally formed with said peripheral portion and extending radially inwardly into said aperture at approximately common intervals around the circumference of said aperture; and said conduit having a plurality of slots formed in the vicinity of one end of the conduit, said slots spaced substantially in a common transverse plane at intervals corresponding to the spacing intervals of said conduit flange tabs; and wherein said tabs extend into said conduit slots and are loosely retained therein, holding said conduit and head in assembled relationship via said conduit flange, with the peripheral portion of the flange held spaced from the conduit by limited spaced contact between the tabs and slots, thus significantly reducing thermal conductivity between the conduit, flange and head assembly.

2. A fitting according to claim 1, wherein said non-rigid joint further comprises:

each of said tabs having at least one shoulder portion extending from said peripheral portion and a lip portion extending from said shoulder portion into the corresponding conduit slot, each shoulder portion abutting the conduit at an edge of the corresponding slot such that said conduit flange peripheral portion is circumferentially spaced apart from said conduit.

3. A fitting according to claim 2, wherein said non-rigid joint further comprises:

the peripheral portion of said at least one conduit flange having an annular shape;

said conduit having a circular cross-section;

said annular peripheral portion having three of said tabs formed integrally therewith at 120° intervals around the circumference of said conduit flange aperture; and said conduit flange having three slots formed at corresponding 120° intervals for engagement of said slots with said tabs.

4. A fitting according to claim 1, wherein said non-rigid joint further comprises:

a top flange secured to the head assembly and having depending legs thereon;

a bottom flange secured to the lower end of the legs;

said conduit flange secured to the bottom flange in spaced relation thereto; and intumescent means secured between the conduit flange and bottom flange.

5. A fitting according to claim 1, wherein said non-rigid joint further comprises:

a retaining clamp secured to the conduit below the floor and having means extended into contact with the floor for clamping the floor between the head assembly and retaining clamp.

6. A fitting according to claim 1, wherein said non-rigid joint further comprises:

the retaining clamp being secured on the conduit between the ends thereof; and a conduit flange secured on the other end of the conduit via interengaged tabs and slots, for connection to a receptacle.

7. A fitting according to claim 1, wherein said non-rigid joint further comprises:

a top flange secured to the head assembly and having depending legs thereon;

a bottom flange secured to the lower end of the legs;

said conduit flange secured to the bottom flange in spaced relation thereto;

intumescent means secured between the conduit flange and bottom flange;

a retaining clamp secured to the conduit below the floor and having means extended into contact with the floor for clamping the floor between the head assembly and retaining clamp;

the retaining clamp being secured on the conduit between the ends thereof; and a conduit flange secured on the other end of the conduit via interengaged tabs and slots, for connection to a receptacle.

8. A fitting according to claim 1 or claim 2 or claim 4 or claim 5 or claim 6 or claim 7, wherein said non-rigid joint further comprises:

first and second conduit sections each having conduit flanges secured to each end thereof via interengaged tabs and slots; and intumescent means connected between the head assembly and first conduit section and between the first and second conduit sections.

* * * * *